United States Patent Office

3,383,336
Patented May 14, 1968

3,383,336
RESINOUS INSOLUBLE REACTION PRODUCTS
Hiroshi Kuyama, 143-3 5-chome, Takasago-cho, Saitama-ken, Urawa-shi, Japan, and Yoichi Utsunomiya, 1–211 Kita-machi, Nerima-ku, Tokyo, Japan
No Drawing. Continuation-in-part of application Ser. No. 364,767, May 4, 1964. This application June 27, 1966, Ser. No. 560,861
13 Claims. (Cl. 260—2.2)

ABSTRACT OF THE DISCLOSURE

Insoluble resinous crosslinked copolymers are prepared by copolymerizing mixtures of styrene, divinyl benzene and acrylonitrile. An additional, polar monomer, such as methyl acrylate or methacrylic acid, may optionally be included. These resins are converted to strong acid cation exchangers by sulfonation and to weak or strong base anion exchangers by nitration followed by reduction and, in the case of strong base resins, quaternization.

---

This application is a continuation in part of our applications S.N. 176,401 which was filed on Feb. 28, 1962, and S.N. 364,767 which was filed on May 4, 1964, both of which have been abandoned.

The present invention relates to resinous reaction products of vinyl aromatic hydrocarbon copolymers, and to their preparation and use. More particularly, it relates to insoluble reaction products which are obtained by reacting polar reagents, such as sulfonating or nitrating agents, with a crosslinked copolymer which is made by the copolymerization of (a) a vinyl monomer containing an aromatic nucleus, with (b) acrylonitrile and/or methacrylonitrile, and (c) a cross-linking monomer.

Cross-linked vinyl aromatic hydrocarbon copolymers which do not contain acrylonitrile or/and methacrylonitrile have little affinity for polar reagents, such as sulfonating or nitrating agents, and require severe reaction conditions and a long time for the reaction. By comparison, the copolymer obtained in the process of the present invention, by copolymerizing a certain quantity of a monomer containing nitrile groups, has a three dimensional net structure. Despite its insolubility and unmeltability, the novel product has a high affinity for polar reagents, permitting those reagents to penetrate therein readily so as to facilitate their reaction, and makes possible conclusion of the reaction in a short period of time under mild conditions. As a result, the time required for the resin manufacture is remarkably reduced, and the product is tremendously improved because no cracks or internal strains result.

Usually, when chemical reactions are run with high molecular weight compositions, especially cross-linked materials, very complicated factors will be involved unlike the case of carrying out chemical reactions with ordinary low molecular weight materials. Usually, the yield is low when such high molecular weight compositions are subjected to the same chemical reaction which, when carried out with low molecular weight compounds of the same series, give very high yields. This is because the high molecular weight compositions require severe reaction conditions and often are met with severe side reactions. The cross-linked compounds present even more complicating factors because they are insoluble in solvents, remain unmelted by heating, and have no free movement of the molecules. Therefore, the possibility of their reactions depends entirely on the affinity between the reaction reagents and the macromolecular compositions.

It is common that the high molecular weight substance lacks the necessary reactivity, particularly when the reaction reagent to be used is an inorganic polar compound (such as sulfuric acid or nitric acid). The preparation of ion-exchange resins is one example of such cases; it requires highly complicated processes, or the use of assistants such as swelling agents, or otherwise necessitates sacrificing some mechanical properties of the product. It is usually difficult to effect the chemical reaction of a base substance, such as a cross-linked high molecular weight base compound having a certain large size, and still keep the original shape and mechanical strength of the compound perfectly after completion of the reaction, because the chemical reaction has to proceed uniformly throughout the entire portion of said solid matter, on the surface and on the inside, lest there should develop any strains inside the compound.

However, the chemical reaction for insoluble, unmeltable high molecular weight solid materials, having a three-dimensional net structure, starts on specific portions such as the surfaces in contact with other reacting substances. The physical properties of a base compound before the reaction differs markedly from those after the reaction due to chemical transformation of the substance, and the difference causes substantial strains of the internal structure or crushes the product. The object of the present method is to develop in such insoluble and unmeltable high molecular weight solid materials a great affinity for polar reagents, thereby to make quite smooth the chemical reaction thereof, a feat which is otherwise difficult to accomplish.

The process of producing cation exchange resins of sulfonic acid type which heretofore has been generally employed has been such that an insoluble, unmeltable, fundamental high molecular weight base compound, which has been obtained by copolymerizing an aromatic nucleus-containing monomer with a cross-linking monomer, is subjected to the action of a sulfonating agent immediately upon the copolymerization of or after swelling with a solvent that follows the copolymerization. Such a base compound lacks affinity for sulfonating agents, and as a result, it first becomes sulfonated on the surface under severe conditions.

The sulfonated portions form a composition such as high molecular weight benzene sulfonic acid, and thus acquire the affinity for sulfonating agents. Then the reaction proceeds through this layer toward the inside of the resin. Hence, during the course of the reaction both sulfonated portions and unsulfonated portions are formed. As a result, the swelling rates differ widely, with the result that cracks are produced, or, if not, strains are left inside which eventually crush the product when it is used repeatedly as an ion-exchange resin. In order to solve this problem, numerous attempts have hitherto been made. However, they have been concentrated on improvements in the reaction process for sulfonation, and there has been no precedent for a process as under the present invention which, in the manufacture of high molecular weight base materials, makes possible materials which contain a group of nitriles by copolymerization, and which have an affinity for polar reacting agents.

Copolymerization of such a base substance with a small amount of acrylonitrile or/and methacrylonitrile brings unexpectedly remarkable effects. Generally the amount employed is less than 20% by weight of the total monomers, although it is preferred to use much less, usually on the order of 1 to 5%. Even though the quantity of the nitrile or nitriles accounts merely for 0.1 to 1 percent by weight of the total quantity of the monomers, the copolymer behaves quite differently when contacted with concentrated sulfuric acid than do ordinary ones which do not contain the nitriles by copolymerization. The reaction takes place at low temperatures, smoothly, and in a short period of time. When the nitrile content is high, the copolymer develops heat, absorbs concentrated sulfuric acid, and becomes swollen. It will be observed that, when a cross-linked polystyrene not containing nitrile groups is to be sulfonated with concentrated sulfuric acid, if the reaction is stopped after the initial sulfonating reaction and an examination is made of the distribution of sulfonic groups in the inside and surface portion of the beads, the groups are conspicuously in the surface portion. On the contrary, if cross-linked polystyrene containing nitrile groups are similarly examined for introduction of sulfonic groups, after stopping the initial sulfonating reaction, it will be found that the reaction has proceeded far more uniformly than in the former case.

It has been known, heretofore, that acrylonitrile or methacrylonitrile can be copolymerized with a wide variety of monomers. However, the processes so far in use have served merely to improve the physical properties of the copolymers themselves, for example the impact strength. there is no precedent for a process which gives the copolymers an affinity for polar reagents, hence improving the chemical reactivity of the copolymers, excepting the process of the present invention. Moreover, the resin obtained by chemical reactions with such fundamental high molecular weight base substances retain the physical and mechanical properties of acrylonitrile-containing fundamental copolymers known heretofore.

The closest prior art process with which we are familiar is the two-step polymerization procedure disclosed in Japanese patent 237,101 (which issued on Nov. 26, 1957, from application No. 29–27553 filed on Dec. 17, 1954, and published on Aug. 17, 1957, as publication No. 32–6387). In that method the first step is to partially polymerize some of the monovinyl compound without any cross-linking monomer. In the second step there is added a polyvinyl crosslinking monomer, and if necessary an un-polymerized monovinyl monomer, to the partially polymerized product. The result is a partially polymerized linear polymer which is not chemically crosslinked in the final copolymer composite, but instead is existent merely as part of the entanglements of the network in the copolymer structure. By contrast, in the copolymer composition of the present invention any polymerizable monomers are bound by the chemical bonds as a copolymer, and the final copolymer product has entirely different properties from the copolymer in which the non-crosslinked linear polymer exists in the form of a physical mixture or solid mixture which is obtained when the partial polymerization step is employed as mentioned above.

The substantial differences just described between the copolymer compositions of Japanese Patent 237,101 and the present invention have been demonstrated in a number of ways by comparative experiments involving products made in accordance with the disclosure of that patent and those made in accordance with the disclosure hereof. All of these experiments have proven the very considerable superiority of the copolymers of the present applicants. In benzene extractions using a Soxhlet extraction apparatus, for example, only a very small fraction of extractables were removed from the present inventive composition, whereas the partially polymerized matter of the prior art composition was quantitatively extracted. In comparing the differences in swelling ratio in organic solvents, using toluene and employing the test described by Pepper in J. Chem. Soc. 1952, 13,129, the novel compositions absorbed an average of about 10% more of the solvent than did the prior art compositions. (Increased swelling capacity is an important factor in the ion exchanging performance capacity of such composition.) The copolymer particles produced by the partial polymerization processes of the Japanese patent are mixtures of translucent and opaque beads. By sharp contrast, the copolymers of the present invention are truly transparent. These visual differences represent differences in the internal structures of the two copolymers, the copolymer of the Japanese patent having an undesirably heterogeneous structure, whereas the copolymer of the present invention is desirably quite homogeneous.

Another important superiority of the present invention over the invention disclosed in Japanese Patent 237,101 is in the respective manufacturing procedures. The partial polymerization technique of the said prior art disclosure leads to opaque copolymers, as stated above, but even that opacity is not uniform in all parts of the particles. To make the copolymer pearl-like (or bead form), a suspension polymerization technique is employed. Suspension-copolymer beads obtained by the partial polymerization process are not uniform in appearance, i.e., they are a mixture of opaque and translucent particles. In further determining the differences of the prior art and the present invention, the opaque particles were separated from the translucent ones, and a comparison made as to the amount of toluene which they could absorb under identical conditions. The translucent particles absorbed over 20% more toluene than the opaque particles when submitted to the Pepper test referred to above.

It must be self-evident from the foregoing that the two-step polymerization process disclosed in Japanese Patent 237,101 is complicated and troublesome, and moreover that process is attended with numerous difficulties. For one thing, in the reference process the partially polymerized linear polymer is dissolved into un-polymerized monomer. Now, it is well known that the viscosity of monomer mixtures increases in marked degree when the solution contains linear polymers. This is particularly the case when the content of the polymer in the monomer mixture is more than 10% by weight, in which case the viscosity of the monomer mixture reaches to 300 poises. Such an abnormally high viscosity of the monomer mixture containing linear polymers dissolved therein causes much trouble in effecting suspension polymerization. One of the major faults is that, when the bead form of the copolymer is converted to ion exchange resins, the uniformity of monomer dispersion in water becomes very poor from the standpoint of their physical and chemical structures. The consequence is that it becomes very difficult to adjust the particles of the copolymer to the proper size, and also to make beads with a homogeneous final copolymer structure. By sharp contrast, however, no such difficulties are encountered when the process of the present invention is employed.

Two final comparisons will demonstrate the unquestionable superiority of the products of the present invention over those obtainable in accordance with the process of the reference Japanese Patent 237,101. This comparison is concerned with the relative chemical reactivity to polar reagents of both products, and was made by sulfonating the copolymer products in each case with concentrated sulfuric acid under identical conditions. The rate of reaction of each was calculated, using the measurement of salt-splitting capacity of the product as a means of determining the speed of sulfonation. The improvement of the present invention over the reference was indeed startling; in the first half to one hour of reaction the salt-splitting capacity of the products was at least two to three times as great as the capacity of the prior art products.

The physical stabilities of the sulfonated copolymer (cation exchanger) of the reference and of the present invention were compared. The sulfonated resins, after being completely hydrated in water, were screened so as to separate out particles which would pass through a 30-mesh U.S. Sieve. These resins were put into glass bottles with water and some small glass beads, then shaken by a mechanical device for 10 hours. At the end of this time the resins were again passed through the 30-mesh U.S. Sieve with the result that over 95% of the resins of the present invention were retained on the sieve screen, whereas less than 1% of the prior art resins were so retained. This striking superiority of the resin of subject application makes it quite obvious that it is a product which differs in kind from that disclosed in Japanese Patent 237,101.

Suitable aromatic unsaturated monomers useful as main monomers for the resin of the present invention include: styrene, vinyl-alkylbenzenes such as vinyltoluene and vinylxylene, α- and/or β-alkylstyrene such as α-methylstyrene, vinylnaphthalenes, vinylalkylnaphthalenes, α- and/or β-alkylvinylnaphthalenes, analogs of anthracene and phenanthrene corresponding to the above, and their halogeno- or alkoxy-substituted monomers. Moreover, it is a matter of course that other copolymerizable monomers are able to be copolymerized with them as the case may require.

Sometimes a secondary monomer is included along with the main monomer. For this purpose any polar vinyl monomers will do, examples being methyl acrylate, methacrylic acid, methyl methacrylate, methyl vinyl ketone, dimethyl maleate, and dimethyl fumarate.

Useful cross-linking agents include: divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylene-dimethacrylamide, N,N'-ethylenediacrylamide, 1,2 - di(α - methylmethylene sulfonamide) - ethylene, trivinylbenzene, trivinylnaphthalene, and polyvinylanthracenes.

Particularly preferred polyvinylidene monomers, usually known as cross-linking agents, include polyvinyl aromatic hydrocarbons such as divinylbenzene, trivinylbenzene, and divinylnaphthalene, glycol dimethacrylates such as ethylene glycol dimethacrylate, and polyvinylethers of polyhydric alcohols such as divinoxyethane and trivinoxypropane. As the sulfonating agents, sulfuric acid, fuming sulfuric acid, chlorosulfonic acid, and sulfur trioxide are preferred in any sulfonation process, for example with or without solvent.

The ratio of the monovinyl monomers to the polyvinylidene monomers may be varied widely depending on the use for which the polymers are intended.

The ratio of acrylonitrile and/or methacrylonitrile to vinyl monomer required for the resin to be used for the purpose of the present invention may be optionally selected in accordance with the intended uses. However, as was indicated above, a preferable amount of acrylonitrile and/or methacrylonitrile is below 20% of the total weight of monomers. This is because the inclusion of a relatively small quantity or quantities of acrylonitrile and/or methacrylonitrile can make possible attainment of the features as above described. In cases where it is desired to employ mixtures of acrylonitrile and methacrylonitrile, the two may be used interchangeably insofar as the ratio of one to the other is concerned. The copolymers obtained by any of various polymerization processes have the special chemical properties abovementioned, regardless of their shapes.

The high molecular weight base substances to be used in the process of the invention may be obtained by first mixing a main monomer, as above listed, with a cross-linking monomer and acrylonitrile and/or methacrylonitrile to prepare a monomer mixture. If necessary, a secondary monomer is added thereto along with a solvent not related to the reaction, a plasticizer, and the like. Where necessary, there may also be added a polymerization accelerator. The mixture is then polymerized by any conventional process of block polymerization, suspension polymerization, emulsion polymerization, or solution polymerization. In some instances the mixture may be copolymerized by the graft-polymerization process. Of course, the ordinary monomers must not necessarily be polymerized singly, but may be processed as any desired mixture of various monomers.

The high molecular weight base compounds containing nitrile groups, which characterizes the present invention, are subjected to chemical reactions very easily with inorganic polar reagents. Particularly distinct chemical reactions effected in accordance with the present invention are sulfonation and nitration. In the sulfonation process, sulfonic acid groups are readily introduced into the aromatic nucleus to form a cation exchange resin of the sulfonic acid type. In the nitration process, nitro groups are introduced into the aromatic nucleus, which are reduced by an ordinary procedure into amino groups. These groups, if necessary, may be alkylated to secondary or tertiary amines, or quaternary ammonium, and an anion exchange resin may thus be produced. In any case, unlike the compounds which do not contain nitrile groups upon copolymerization, those prepared under the present invention may be sulfonated or nitrated under mild conditions in short periods of time. Thus, the time required for the production is remarkably shortened, and the high molecular weight materials thus prepared are free from cracks and internal strains. The products have a highly transparent and esthetic appearance. They are not destroyed by use for several thousand cycles, and remain unaffected by use in dry-wet cycles. Ion exchange resins obtained from conventional base materials not containing nitrile groups are particularly susceptible to dry-wet cycles and tend to be damaged severely. The ion exchange resins obtained by the process of the present invention, by comparison, are elastic, and not destroyed when used under high pressure.

It is further evident from infrared spectra that the nitrile groups from acrylonitrile and/or methacrylonitrile, copolymerized for the purposes set forth hereinabove, are transformed by sulfonation and nitration into acid amide groups and/or carboxylic acid groups.

Example 1

200 g. of styrene, 33 g. of acrylonitrile, and 91.7 g. of 53.6% divinylbenzene are fully mixed and 4 g. of benzoyl peroxide is dissolved into this mixture. A dispersant is added to 400 cc. of water into which the aforementioned monomer mixture is dispersed with stirring, and the whole mixture is heated at 70° to 72° C. for 6 hours to form polymer beads. They are washed with water, dried and subjected to heating at 120° C. for 6 hours (the copolymer-1). By practically the same procedure as for the copolymer-1, beads of styrene divinylbenzene copolymer free from acrylonitrile are prepared (the copolymer-2). Separately, 250 g. of acrylonitrile, 60 g. of 53% divinylbenzene and 5 g. of benzoyl peroxide are mixed together to form a uniform solution, wherefrom polymer beads are obtained by the same procedure as for the copolymer-1. This product is called the copolymer-3. The behaviors of the aforementioned three kinds of copolymers against sulfuric acid are observed. When the aforementioned three copolymers are thrown into 99% sulfuric acid at room temperature, the copolymer-2 (styrene divinylbenzene) remains substantially unchanged, while the copolymer-3 (acrylonitrile divinylbenzene) absorbs a considerable amount of the acid and markedly swells. The copolymer-1 (a cross-linked polystyrene containing acrylonitrile in a state of copolymer) is found readily impregnated with the sulfuric acid.

Example 2

Of the aforementioned three kinds of copolymers, the copolymer-1 and 2 are screened by their particle sizes, and the portions of 30 to 40 mesh are put aside for the sulfonation reaction.

(1) Sulfonation at 80° C.:

By using 99% sulfuric acid, beads of the aforementioned two copolymers are sulfonated at 80° C. The ion-exchange capacity of the copolymer-1 reaches 1.5 meq./ml. in only one hour, while that of the copolymer-2 fails to reach 0.5 meq./ml. In 2 hours, the capacity of the copolymer-1 amounts to 2.0 meq./ml.

(2) Sulfonation at 100° C.:

By using 99% sulfuric acid, the aforementioned two copolymers are sulfonated at 100° C. In one hour the capacity of the copolymer-1 reaches 1.8 meq./ml., while that of the copolymer-2 reaches in the vicinity of 0.5 meq./ml.

(3) Sulfonation at 80° C. with lower-concentration sulfuric acid:

By using 96% sulfuric acid of commercial grade, the aforementioned two copolymers are sulfonated at 80° C. The ion-exchange capacity of the copolymer-1 reaches 1.8 meq./ml. in 3 hours, while the copolymer-2 is practically not sulfonated.

(4) On beads of copolymer-1 sulfonated at low temperature in short time:

The beads made of the copolymer-1, sulfonated in the procedure as above described at a low temperature in a short time, and with a lower-concentration of sulfuric acid, present a beautiful orange to a light brown color and are substantially free from cracking throughout the beads. The ion-exchange capacity per volume unit is equivalent to those of ordinary products (2 meq/ml.) or more. The cation exchange resin of the sulfonic acid type made from the copolymer-1 has a high degree of cross linking and a moisture content of around 40%. The sulfonic acid resin with such a high cross linking degree, produced by conventional processes, has in most cases suffered from cracking within the beads.

Example 3

200 g. of styrene, 72.4 g. of acrylonitrile, and 109.6 g. of 53.6% divinylbenzene are thoroughly mixed, and are copolymerized in entirely the same way as in Example 1. 100 g. of the copolymer obtained as above is sulfonated with 580 g. of 99.1% sulfuric acid at 80° C. After one hour of the reaction, the ion-exchange capacity of the copolymer amounts to 1.67 meq./ml., but that of the copolymer-2 reaches merely 0.5 meq./ml.

Example 4

600 g. of styrene, 22 g. of acrylonitrile and 104 g. of 59% divinylbenzene are thoroughly mixed and polymerized in the entirely same way as in Example 1. When the copolymer thus prepared is sulfonated with 98.7% sulfuric acid at 100° C. for 3 hours, it acquires an ion exchange capacity of 1.9 to 2.0 meq./ml. Meanwhile, sulfonating the copolymer-2 in Example 1, under entirely the same conditions as in this example, the exchange capacity is 0.8 to 0.9 meq./ml.

Example 5

600 g. of styrene, 8.0 g. of acrylonitrile and 102 g. of 59% divinylbenzene are thoroughly mixed and copolymerized in entirely the same way as in Example 1. When the copolymer thus prepared is sulfonated with 98.7% sulfuric acid at 120° C. for 2.5 hours, its ion exchange capacity rises to 1.8–2.0 meq./ml. Meanwhile, when the copolymer-2 in Example 1 is sulfonated under the same conditions as above, its exchange capacity reaches 0.9–1.0 meq./ml.

Example 6

A cation exchange resin of the sulfonic acid type produced as in Example 5, and an ordinary cation exchange resin made by sulfonating a high molecular weight base compound which does not contain acrylonitrile in a copolymer state and has the same degree of cross linking as the above resin, both in the form of sodium salt, are dried under the same conditions with infrared lamps at 75–80° C. for 1.5 hours. Then both are placed in water, and again dried in the same way as above, and the procedures are repeated. After 10 cycles of these procedures, 53.8% of the ordinary cation exchange resin was destroyed, while the resin of Example 5 lost only 8.7%.

Example 7

The copolymer containing about 1% of acrylonitrile, which has been used in Example 5, and beads of divinylbenzenestyrene copolymer (containing 8.5% of divinylbenzene) free from acrylonitrile, are each nitrated with a mixture of nitric acid and sulfuric acid at a mixing ratio of 2:3. The acrylonitrile-containing beads are readily nitrated at a temperature below 20° C., whereas the beads not containing acrylonitrile are nitrated at 30–40° C., with a resultant large percentage of destruction. In addition, when the latter is nitrated at 30–40° C., the heat of reaction can hardly be controlled, and sometimes all of the beads are destroyed. By contrast, the beads prepared under the process of the invention are nitrated in a mild way without the danger of destruction. The reduction is carried out by an ordinary process.

Example 8.—Preparation of a teropolymer of 91% styrene, 8% divinylbenzene and 1% acrylonitrile I. Charge

| Material: | Amount, grams |
|---|---|
| (a) Water | 181 |
| (b) 0.1 N NaOH solution | 239 |
| (c) 0.1 N $H_3BO_3$ | 400 |
| (d) Amberlite W-1 | 6.3 |
| (e) Pharmagel | 0.038 |
| (f) Styrene | 509.5 |
| (g) Divinylbenzene [1] | 84.5 |
| (h) Acrylonitrile | 6.0 |
| (i) Benzoyl peroxide | 2.4 |
| (j) Boric acid | 1.95 |

[1] The divinylbenzene assay was 56.8%.

II. Procedure (a) Items a, b, c, d and e were charged to a three liter three neck flask equipped with a single bladed agitator and thermometer. The materials were agitated for ten minutes and then sampled for pH (pH=11.0).

(b) Items f, g, h and i were combined in a beaker and mixed thoroughly. The monomer mix was then added to the aqueous phase without agitation.

(c) The agitator was adjusted so that the blade was ¼" below the surface of the liquid. Then the mixture was agitated for thirty minutes at 230 r.p.m. at a temperature of 25–30° C.

(d) The boric acid (j) was then added and agitation was continued for five minutes. The mixture was sampled for pH (pH=8.9).

(e) The mixture was then heated to 76° C. while continuing to mix at a rate of 230 r.p.m. The heat up required 15 minutes.

(f) The catalyzed mixture was agitated for five hours at 76 to 78° C. using automatic pot lifter equipment to maintain the temperature.

(g) At the end of the five-hour hold, the mixture was heated to 96° C. over a five-minute period, and agitation was continued for one hour at 96 to 98° C.

(h) At the end of the one-hour hold period, the mixture was cooled to 75° C. and sampled for pH (pH=8.9).

(i) The reaction mixture was then quenched with about 1500 cc. of water. The agitator was stopped and the liquid was siphoned from the beads.

(j) Four additional water washes and siphons were made and the beads were then drained on a Buchner funnel.

(k) The wet beads were then dried for six hours in a 125° C. oven. Yield=583 grams of oven-dried beads.

SULFONATION

I. Charge

| Material: | Amount, grams |
|---|---|
| (a) $H_2SO_4$, 98% tech. | 537 |
| (b) Copolymer beads | 100 |
| (c) 10% NaOH | 500 |

II. Procedure (a) The sulfuric acid (a) was charged to a two liter three neck flask equipped with agitator, thermometer and automatic pot lifter. The beads were added at 27° C. to the stirred sulfuric acid.

(b) The mixture was then heated to 120° C. over a twenty-five minute period.

(c) The reaction mixture was agitated for two hours while the temperature was maintained at 120+1° C.

(d) The mixture was then cooled to 50° C. One liter of cold water was added slowly at 50 to 70° C. Agitation was continued for five minutes and then the dilute acid was siphoned from the beads.

(e) Three additional water washes (one liter $H_2O$) and siphons were carried out and then the 10% sodium hydroxide solution (c) was added. The resulting mixture was agitated for one hour at 35 to 45° C.

(f) The aqueous layer was siphoned from the beads and the latter were transferred to a one liter graduated cylinder for backwashing.

(g) The sulfonated beads were backwashed for one hour and fifteen minutes. The effluent pH at that time was 7.4.

(h) The beads were then transferred to a Buchner funnel and drained thoroughly. Yield=389 g.

III. Analysis

Whole beads, percent _____ 91.6
Wt. cap. meq./g. _____ 4.48
Moisture holding capacity, percent _____ 46.7

Employing procedures similar to those used in the foregoing examples, a vinylalkylbenzene or an α- or β-alkylstyrene was substituted for at least a portion of the styrene as the unsaturated aromatic, or main monomer, and a useful composition prepared in accordance with the present invention. The following examples are indicative of the scope of such substitutions, but understandably should not be considered as restricted thereto.

Example 9

A mixture of styrene (121.6 g.), ethylvinylbenzene (4.8 g.), acrylonitrile (3.0 g.), divinylbenzene (5.2 g.) and 1 g. of benzoylperoxide was charged to a solution of 0.5 g. of the ammonium salt of a commercial styrene maelic anhydride copolymer in 175 g. of water. The mixture was agitated until the monomer components were dispersed as fine droplets and then heated at 85°–90° C. for 5 hours. The resultant copolymer particles were filtered and washed with water. Based on the same procedure as above, copolymer particles of styrene, ethylvinylbenzene, and divinylbenzene free from acrylonitrile were prepared. These two kinds of copolymers were sulfonated with 98.7% sulfuric acid at 117° C. for 4 hours. While the ion-exchange capacity of the former was 1.9 meq./ml., that of the latter was 1.4 meq./ml.

Example 10

A mixture of styrene (40 g.), α-methylstyrene (44 g.), technical divinylbenzene (15.8 g. of 53 percent concentration), acrylonitrile (1.0 g.) and 0.9 g. of azobisisobutyronitrile was charged to a solution of 1.0 g. of polyvinylalcohol in 200 g. of water. Agitation was applied so that the monomer phase was dispersed in the form of fine droplets. The polymerization was carried out by heating at 85°–90° C. for 5.5 hours. The beads so formed were filtered and washed with water. By the same procedure as above, copolymer beads of styrene, α-methylstyrene and divinylbenzene (without any acrylonitrile) were prepared. These copolymers were sulfonated with 98.9% sulfuric acid at 115°–117° C. for 6 hours. The ion-exchange capacity of the former was 2.12 meq./ml., while that of the latter was 1.92 meq./ml.

Example 11

A mixture of styrene (106 g.), β-methylstyrene (118 g.), acrylonitrile (4.0 g.), divinylbenzene (16.3 g.) and 2.0 g. of azobisisobutyronitrile was added to a solution of 1.2 g. of a commercial styrene maleic anhydride copolymer in 400 g. of water. The mixture was dispersed under stirring and polymerized by heating at 86°–92° C. for 6 hours. The beads so formed were filtered and washed with water. By the same procedure as above, copolymer particles of styrene, β-methylstyrene, divinylbenzene without acrylonitrile were prepared. These copolymers were sulfonated with 99.2% sulfuric acid at 117°–118° C. for 6 hours. The ion-exchange capacity of the former was 2.10 meq./ml., while that of the latter was 1.90 meq./ml.

Just as there was substituted in Examples 9–11 other main monomers for at least a part of the styrene in Examples 1–8, there may also be substituted for the divinylbenzene cross linking agent some other suitable composition. Following are some examples which illustrate this.

Example 12

A mixture of styrene (92 g.), trivinylbenzene (8.0 g.), acrylonitrile (1.0 g.) and benzoyl peroxide (1.0 g.) was dispersed in a solution of 0.6 g. of the ammonium salt of a commercial styrene-maleic anhydride copolymer in 180 g. of water. The polymerization was carried out by heating at 86°–90° C. for 6 hours. The beads so formed were filtered, washed with water and then air-dried. The air-dried product (70 g.) and sulfuric acid (99%, 420 g.) were heated with stirring at 115–117° C. for 5 hours, and its ion-exchange capacity was 2.0 meq./ml. On the other hand, the copolymer beads of styrene trivinylbenzene free from acrylonitrile were prepared, based on nearly the same procedure as above mentioned, and were sulfonated in the same condition for 5 hours. Its ion-exchange capacity was 1.72 meq./ml.

Example 13

A mixture of styrene (106 g.), acrylonitrile (1.0 g.), ethylene glycol dimethacrylate (13 g.) and 1.2 g. of azobisisobutyronitrile was charged to a solution of 2.0 g. of polyvinylalcohol in 400 g. of water. The mixture was dispersed under stirring and polymerized by heating at 80°–85° C. for 7.5 hours. The beads so formed were filtered and washed with water. Based on the same procedure as above, copolymer particles of styrene, acrylonitrile and ethylene glycol dimethacrylate free from acrylonitrile were prepared. These copolymers were sulfonated with chlorosulfuric acid in liquid $SO_2$ at $-12°\sim-15°$ C. for 3 hours. The ion-exchange capacity of the former was 1.57 meq./g., while that of the latter was 1.06 meq./g.

It is also possible to use one or more of the main monomers without using any styrene at all, and thereby obtain useful products in accordance with the present invention. Following are some examples which illustrate this.

Example 14

A mixture of ethylvinylbenzene (135 g.), acrylonitrile (3.0 g.), divinylbenzene (12.0 g.) and 1 g. of benzoylperoxide was charged to a solution of 0.5 g. of the ammonium salt of a commercial styrene maleic anhydride copolymer in 200 g. of water. The mixture was agitated so that the monomer phase was dispersed as fine droplets and then heated up to 85°–90° C. for 8 hours. The thus obtained copolymer particles were filtered and washed with water. By the same procedure as described above, copolymer particles of ethylvinylbenzene and divinylbenzene free from acrylonitrile were prepared. These two kinds of copolymer were sulfonated with 99.2% sulfuric acid at 115°–117° C. for 4 hours. While the ion-exchange capacity of the former was 1.78 meq./ml., that of the latter was only 1.31 meq./ml.

Example 15

A mixture of α-methylstyrene (170 g.), technical divinylbenzene (32.6 g. of 53 percent concentration), acrylonitrile (2.0 g.) and 1.8 g. of azobisisobutyronitrile was charged to a solution of 2.0 g. of polyvinylalcohol in 400 g. of water. Agitation was applied so that the monomer components were dispersed in the form of fine particles. The polymerization was carried out by heating at 80°–85° C. for 10 hours and then at 85°–95° C. for 5 hours. The beads so formed were filtered and washed with water. Based on the same procedure as above, copolymer beads of α-methylstyrene and divinylbenzene without acrylonitrile were prepared. These copolymers were sulfonated with 99.2% sulfuric acid at 115°–117° C. for 6 hours. The ion exchange capacity of the former was 2.00 meq./ml., while that of the latter was 1.88 meq./ml.

Example 16

After 70 g. of β-vinylnaphthalene was melted at 65° C. under a stream of nitrogen, 27 g. of divinylbenzene (56.1% concentration) and 3 g. of acrylonitrile were added to fused β-vinylnaphthalene. Once the monomer mixture was made cool to 40° C., 2.0 g. of benzoylperoxide was added to it and the monomer mixture containing the catalyst was thoroughly mixed. The monomer mixture was charged to a solution of 1.0 g. of polyvinylalcohol in 200 g. of water. The polymerization was carried out by heating at 60°–65° C. for 45 hours, and then completed by heating at 85°–90° C. for 2 hours. The beads so obtained were filtered, washed with water and then air-dried. Based on the same procedure as above, copolymer particles of β-vinylnapthalene and divinylbenzene without acrylonitrile were prepared. These two kinds of copolymer were sulfonated with 99.1% sulfuric acid at 118° C. for 6 hours. While the cation-exchange capacity of the former was 2.03 meq./ml., that of the latter was only 1.82 meq./ml.

Another variation of the present invention mentioned above is to use a secondary monomer along with the main monomer. Following are some examples which illustrate this.

Example 17

212 g. of styrene, 2.5 g. of acrylonitrile, 1.3 g. of methylacrylate and 34.7 g. of 57.8% divinylbenzene were thoroughly mixed and copolymerized in the same way as in Example 1 (U.S. Ser. No. 364,767 Text Example 1). Based on the same procedure, copolymer beads of styrene and divinylbenzene free from acrylonitrile and methylacrylate were prepared. These copolymers were sulfonated with 98.6% sulfuric acid at 110° C. for 5 hours. The ion-exchange capacity ( by weight) of the former was 4.68 meq./g., while that of the latter was 3.18 meq./g.

Example 18

106 g. of styrene, 2.8 g. of acrylonitrile, 1.4 g. methylmethacrylate and 29.8 g. of 56.4% divinylbenzene were thoroughly mixed and copolymerized in entirely the same procedure as in Example 1. In the same way, copolymer particles of styrene and divinylbenzene without acrylonitrile and methylmethacrylate were prepared. These two kinds of copolymer were sulfonated with 99.1% sulfuric acid at 118°–120° C. for 6 hours. The ion-exchange capacity (by weight) of the former attained to 4.1 meq./g., while that of the latter attained to 1.86 meq./g.

We claim:

1. An insoluble, resinous, cross-linked copolymer prepared by copolymerizing a mixture consisting of styrene, divinylbenzene, and an acrylonitrile, the amount of acrylonitrile present being between 0.1 to 5% by weight of the total monomers present in the mixture.

2. The product of claim 1 in which the acrylonitrile is methacrylonitrile.

3. The product of claim 1 in which the acrylonitrile is unsubstituted acrylonitrile.

4. The product of claim 1 in which the acrylonitrile is a mixture of acrylonitrile and methacrylonitrile.

5. The product of claim 1 in which, in addition to the acrylonitrile, there is included in the copolymer mixture a polar secondary monomer selected from the group consisting of methyl acrylate, methacrylic acid, methyl methacrylate, methyl vinyl ketone, dimethyl maleate, and dimethyl fumarate, the total of the acrylonitrile and secondary monomer being present in an amount ranging from 0.1 to 5% by weight of the total monomers.

6. A cation exchange resin which comprises a sulfonated cross-linked copolymer prepared by copolymerizing a mixture of an aromatic monovinyl monomer, a cross-linking monomer, and an acrylonitrile, the amount of the acrylonitrile present in the said mixture amounting to from 0.1 to 5% by weight of the total monomers present therein.

7. The resin of claim 6 in which the acrylonitrile is unsubstituted acrylonitrile.

8. The resin of claim 6 in which the acrylonitrile is methacrylonitrile.

9. The resin of claim 6 in which the acrylonitrile is a mixture of acrylonitrile and methacrylonitrile.

10. The resin of claim 6 in which, in addition to the acrylonitrile main monomer, there is included in the copolymer mixture a polar secondary monomer selected from the group consisting of methyl acrylate, methacrylic acid, methyl methacrylate, methyl vinyl ketone, dimethyl maleate, and dimethyl fumarate the total of the main and secondary monomers being present in an amount ranging from 0.1 to 5% by weight of the total monomers.

11. An insoluble, resinous product which comprises the reaction product of a polar reagent, from the group consisting of a sulfonating agent and nitric acid, and the copolymer from claim 1.

12. The product of claim 11 in which the polar reagent is a sulfonating agent.

13. The product of claim 11 in which the polar reagent is nitric acid.

References Cited

FOREIGN PATENTS 1,321,798   2/1963   France.

WILLIAM H. SHORT, *Primary Examiner.*

SAMUEL H. BLECH, *Examiner.*

C. A. WENDEL, M. GOLDSTEIN, *Assistant Examiners.*